INVENTOR
Howard G. Beck
BY Evans & McCoy
ATTORNEYS

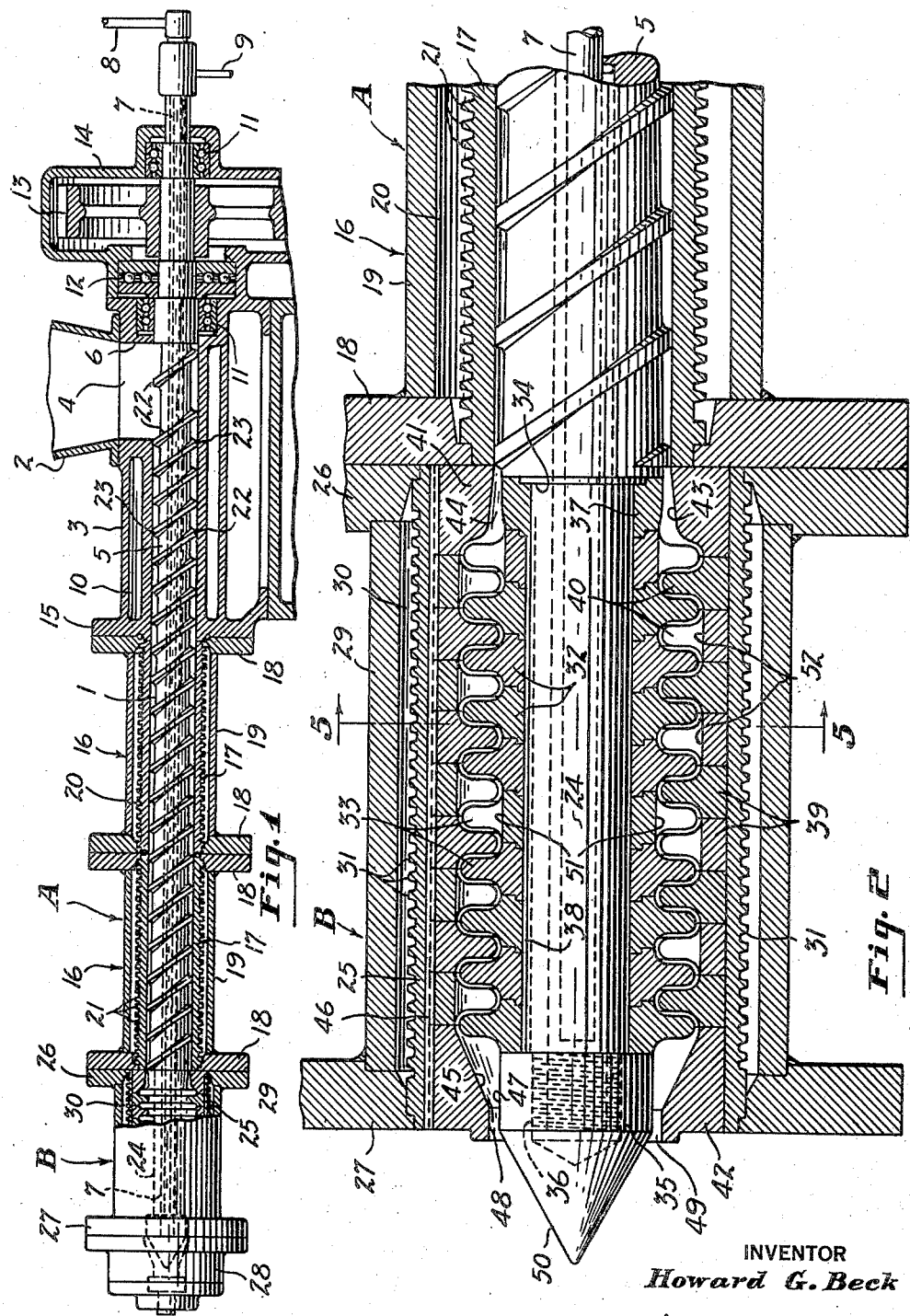

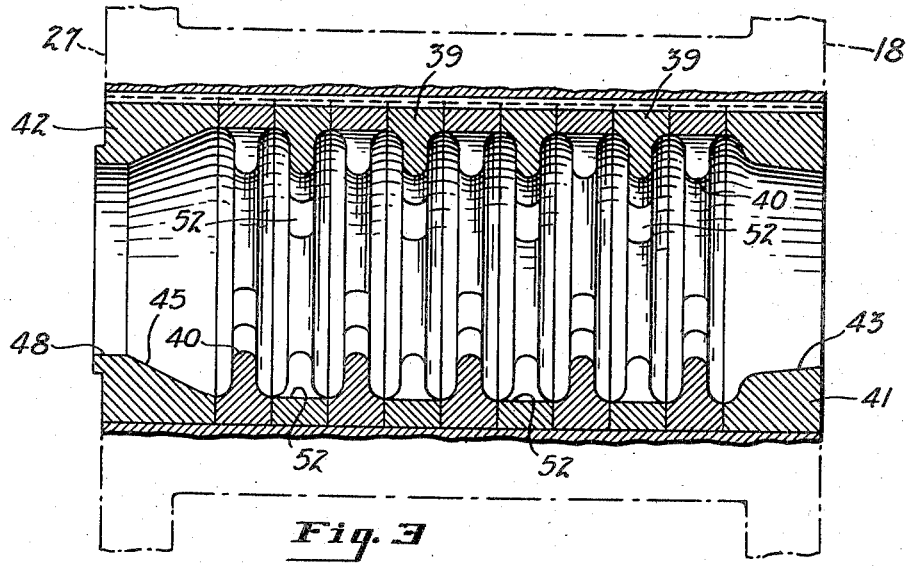
Fig. 3
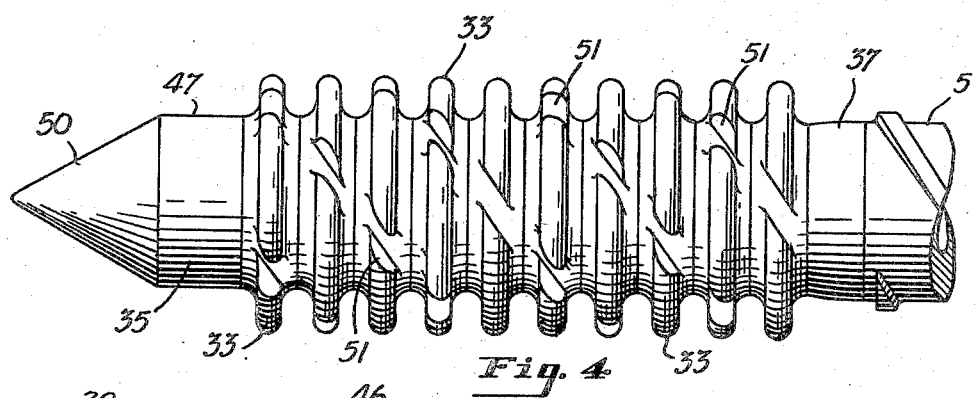
Fig. 4
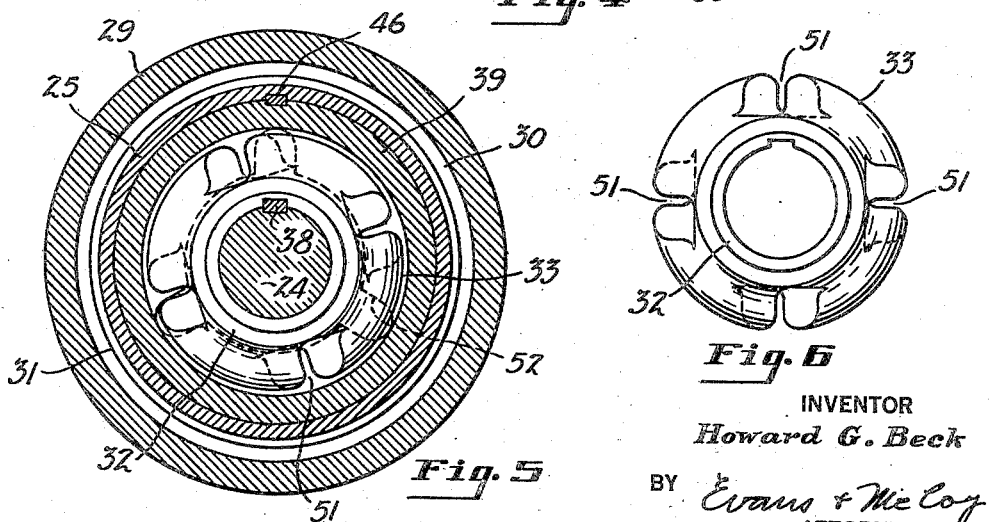
Fig. 5
Fig. 6
INVENTOR
Howard G. Beck
BY Evans & McCoy
ATTORNEYS Nov. 19, 1957 H. G. BECK 2,813,302
METHOD OF AND APPARATUS FOR HOMOGENIZING
PLASTIC OR PLASTICIZABLE MATERIALS
Filed Oct. 20, 1954 3 Sheets-Sheet 3

United States Patent Office 2,813,302
Patented Nov. 19, 1957

2,813,302

METHOD OF AND APPARATUS FOR HOMOGENIZING PLASTIC OR PLASTICIZABLE MATERIALS

Howard G. Beck, Wabash, Ind., assignor to The General Tire and Rubber Company, Akron, Ohio, a corporation of Ohio Application October 20, 1954, Serial No. 463,463

16 Claims. (Cl. 18—12)

This invention relates to the manufacture of plastic compositions and more particularly to a method of and apparatus for homogenizing plastic or plasticizable materials and extruding the same.

The present invention may be utilized for blending plastic materials or for plasticizing, homogenizing and extruding powdered, granular or flaky materials. The homogenizing of the materials is accomplished by causing the materials to flow axially through an annular passageway formed between the closely spaced exterior and interior surfaces of inner and outer coaxial members, the said surfaces conforming substantially to closely spaced surfaces of revolution which are ribbed circumferentially to provide a longitudinally sinuous tortuous passageway. During the flow of material through the passageway one of the coaxial members is rotated relative to the other to subject the material in the passageway to rubbing action between the closely spaced coaxial surfaces, the circumferential ribs causing the material to flow circumferentially in the passageway as well as axially.

The closely spaced surfaces of revolution forming the inner and outer walls of the passageway provide rubbing action throughout the major portion of the length and circumference of the passageway. In order to obtain a more through mixing or blending of the materials than can be obtained by the rubbing action alone, the flow is so controlled that portions of the stream of material passing through the homogenizer are continually being caused to move axially with respect to adjacent portions so as to break the continuity of flow and insure a complete blending of material. Fluctuations in the flow of material effecting the mixing action are induced by causing frequent momentary localized variations in the rate of axial flow in various portions of the passageway.

The homogenizer is preferably in the form of a tubular casing with a rotary agitator mounted within it, the exterior surface of the agitator and the interior surface of the casing conforming substantially to coaxial surfaces of revolution that are closely spaced and that have axially opposed ribbed portions that form circumferential flow directing channels between them. The materials are fed into the tortuous annular passageway between the agitator and casing and are subjected to axial pressure to cause them to flow axially in the passageway. The agitator is rotated and the rubbing action on the material causes circumferential flow in the circumferential channels, and the relatively large areas of the casing and agitator disposed in closely spaced relation continuously subject the material to rubbing or grinding action.

The localized variations in the rate of axial flow to obtain more effective mixing or blending action are preferably caused by momentarily reducing the frictional resistance to axial flow at predetermined timed intervals and at points distributed circumferentially of the passageway. Such reduction in resistance to flow can be accomplished by providing transverse passages across the ribs of the casing and agitator which are so positioned that they register intermittently during rotation of the agitator. In order to reduce the pulsating effect due to variations in driving torque, the passages of adjacent ribs of the agitator and casing are preferably differentially spaced so that the passages are brought into registry at points spaced around the axis of rotation sequentially and progressively during each revolution of the agitator. Passages in axially spaced ribs of both the casing and agitator may be offset circumferentially so that the localized accelerations in the rate of flow occur intermittently along the length of the passageway as well as circumferentially of the passageway. In order to substantially eliminate the pulsating effect the passage of the agitator and casing ribs are preferably disposed to provide both the differential spacing of the passages of adjacent ribs and the circumferential offsetting of the passages axially of the casing. The passages in the agitator ribs are preferably disposed helically so that the agitator when rotated creates a pressure on the material to assist in maintaining the axial flow.

Since the major portion of the surface forming the walls of the passageway are closely spaced, the materials are advanced in a thin stream and are uniformly heated. Since the mixing is effected while the materials are continuously flowing toward the exit end of the passageway, effective mixing or blending may be obtained with the materials moving through the homogenizer at a relatively rapid rate. Since the fluctuations in flow are momentary, localized and distributed uniformly throughout the passageway, and also uniformly timed, pulsations in flow tending to cause irregular extrusion are avoided and torque vibrations are practically eliminated.

When materials to be treated are in powdered, granular or flaky form they are preferably fed to the homogenizer by a feed screw designed to compress the materials progressively as they are fed toward the homogenizer. The frictional rubbing action to which the material is subjected usually generates more heat than is necessary for plasticizing the materials and steam or hot liquid circulated through the agitator and casing usually absorbs heat from the material and serves to prevent overheating of the material.

Serious difficulties have heretofore been encountered in the operation of extruding machines for various plastics because of the fact that corrosive compounds have been formed by overheating of portions of the material being treated which attack the metal of the rotor and casing and which cause blemishes in the extruded product due to particles of burnt material and the presence of metal salts. To minimize these defects it has been common practice to plate the screw and casing with a corrosion resistant metal or to form the screw and casing of corrosion resistant alloys. Even with such expensive equipment it has been necesary to frequently empty and clean the extruders to avoid defects in the extruded product.

The agitator and casing of the present invention can be made of ordinary cold rolled steel and can run for long periods of time without contamination due to decomposition of materials by overheating.

In extruding rubber it has heretofore been necessary to subject the rubber stock that has been compounded in a Banbury mixer to preliminary softening by passage through heated mill rolls and to feed a narrow strip of such material from the mill to the extruder. The homogenizing and extruding machine of the present invention can handle cold rubber stock making it unnecessary to employ the preliminary milling operations. The material delivered in strip form from a Banbury mixer may be stored and fed cold to the feed screw of the homogenizer or such stock may be cut up in small pieces and fed into the receiving hopper.

The invention has for an object to provide a method of rapidly homogenizing materials and delivering them in plastic form which effects a complete blending of materials without previous mixing operations, which effects uniform comminution and dispersion of plastic fragments and other solid fillers and uniform blending of dyes in the plastic materials being treated and which operates at a rapid rate with a relatively small expenditure of power.

It is also an object to provide a plasticizing and extruding machine in which the materials are subjected to a uniform accurately controlled heat so that formation of corrosive compounds by overheating portions of the material is avoided.

A further object of the invention is to provide a plasticizing and extruding machine capable of plasticizing and extruding rubber stock without preliminary softening operations.

Reference should be had to the accompanying drawings forming a part of this specification, in which:

Figure 1 is a view showing a machine embodying the invention, the view being partly in side elevation and partly in longitudinal section;

Fig. 2 is a fragmentary longitudinal section on an enlarged scale through the homogenizing unit and a portion of the feeding and plasticizing unit;

Fig. 3 is a sectional view on an enlarged scale, showing the homogenizer casing;

Fig. 4 is a side elevation of the agitator;

Fig. 5 is a vertical transverse section taken on the line indicated at 5—5 of Fig. 2;

Fig. 6 is an end elevation of the agitator;

Figure 7:
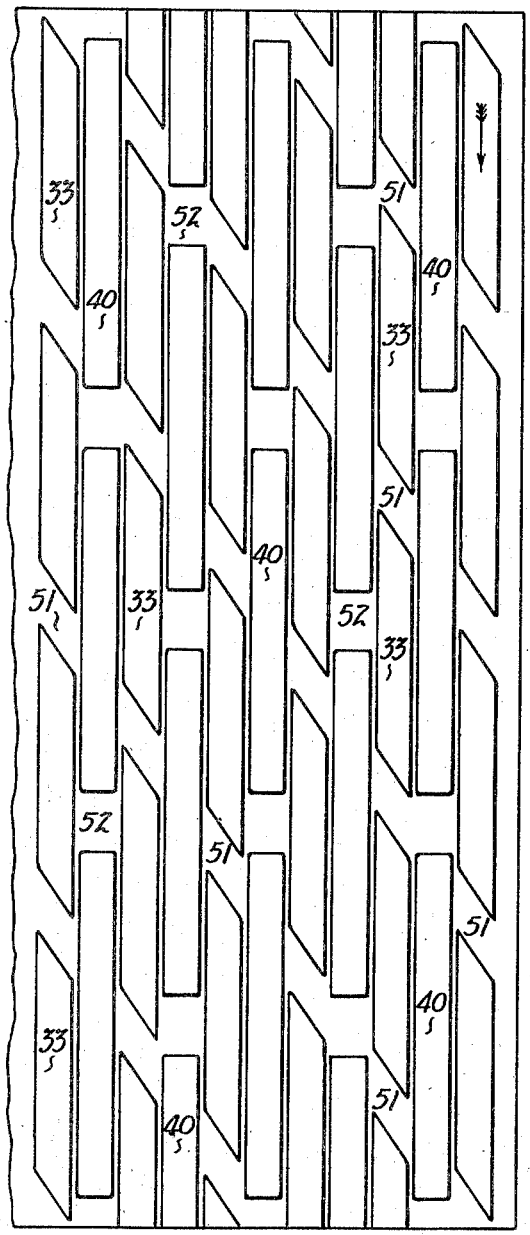
Fig. 7 is a diagrammatic development of the annular passageway through the homogenizer unit.
Figure 8:
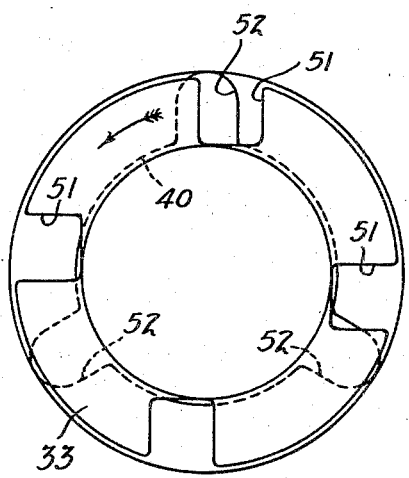
Figs. 8 and 9 are diagrammatic views showing adjacent casing and agitator ribs in different relative angular positions.
Figure 9:
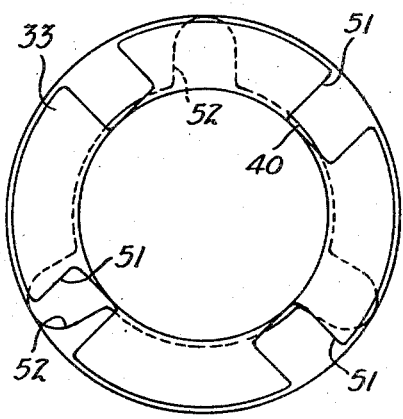

As shown in Fig. 1 of the drawings, apparatus for performing the method of the present invention may comprise a feeding and plasticizing unit A and a homogenizing unit B to which the materials are delivered from the unit A. The feeding and plasticizing unit A may be of a conventional form having a feed screw 1 for delivering the materials from a feed hopper 2 to the homogenizing unit B. The feed screw 1 is preferably mounted in a sectional casing having a receiving section 3 provided with an opening 4 through which the materials are delivered to the screw 1 from the hopper 2.

The screw 1 has a body or shaft portion 5 which is preferably tubular and which extends through the rear wall 6 of the casing section 3. In order to heat or cool the materials being treated, means is preferably provided for circulating a heating or cooling fluid through the interior of the screw shaft 5. This may be accomplished by providing a pipe 7 of a diameter less than the internal diameter of the tubular shaft 5 and extending throughout the major portion of the length of the shaft. Means may be provided for introducing fluid through the tube 7 into the interior of the shaft 5 adjacent its forward end and draining the fluid from the shaft at the rear end thereof. As shown in Fig. 1, connections 8 and 9 may be provided for delivering fluid to the tube 7 and for draining the fluid from the shaft 5. The casing section 3 is provided with an annular fluid chamber 10 surrounding the screw to heat or cool the materials as they are fed from the hopper 2. Radial and thrust bearings 11 and 12 are provided in the rear wall 6 of the casing and a gear 13 attached to the shaft 5 is enclosed in a housing 14 and provides means for driving the screw 1.

The casing 3 is provided with an outwardly projecting attaching flange 15 at its forward end and a plurality of identical casing sections 16 may be interposed between the receiving section 3 and the homogenizer B. The casing sections are preferably detachably connected together so that the casing can be readily accommodated to a feed screw of a length suitable for handling the particular materials being treated. Each casing section 16 has a cylindrical tube 17 that receives the screw 1 with a small running clearance and to the opposite ends of the tube 17 attaching flanges 18 are secured. An outer cylindrical tube 19 of an internal diameter greater than the external diameter of the tube 17 is interposed between the end flanges 18 in a position coaxial with the inner tube 17 and is attached to the flanges 18 by suitable means such as welding. The tubes 17 and 19 provide an annular space 20 between them through which fluid may be circulated to heat or cool the material being advanced by the screw 1. To increase the transfer of heat between the fluid in the chamber 20 and the material being advanced by the screw, the tube 17 may be provided with external circumferential ribs 21.

The screw 1 is preferably a multiple flight screw, the screw shown having two helical flights 22 and 23 which serve to advance the material through the casing. In order to permit the material to flow more freely from the hopper 2 into the casing 3, the helical flight 23 terminates at the forward end of the opening 4 while the helical flight 22 extends to the rear end of said opening so that only one of the helical flights underlies the opening 4.

When handling materials in powdered, granular or flaky form, it is desirable that the material be subjected to gradually increasing compression as it is moved away from the feed hopper in order to compact the material and permit escape of gases. In order to obtain this compressing effect, the volumetric capacity of the spaces between adjacent convolutions of the screw flights is gradually decreased from the feed hopper toward the homogenizer unit. As herein shown, this reduction is accomplished by gradually increasing the diameter of the body or shaft portion 5 of the screw from the rear end of the casing to the forward end thereof. The casing sections within which the screw flights have a close running fit are of cylindrical form and the pitch of the flights is uniform from one end of the screw to the other. The taper of the body portion 5 of the screw is such that the radial thickness of the annular space between the screw body and casing is much less at the discharge end of the screw than it is at the receiving end. Materials fed from the hopper 2 through the casing sections 3 and 16 are compressed and delivered to the homogenizer B in a plastic state such that they have the fluidity required to effect the desired homogenizing action.

The screw shaft 5 has an extension 24 of reduced diameter within the homogenizer unit B and this extension may be integral with the shaft 5 or detachably secured thereto. The homogenizer casing includes a cylindrical tube 25 that is coaxial with the screw shaft extension 24 and that is provided with an attaching flange 26 at its rear end that is attached to the flange 18 of an adjacent casing section 16. The tubular casing member 25 also has a flange 27 at its forward end to which an extruder head 28 is attached. An outer cylindrical tube 29 surrounds the tube 25 and provides an annular fluid chamber 30 surrounding the tubular casing member 25, the tubular member 29 being secured to the flanges 26 and 27 by welding or other suitable means. The tubular member 25 may be provided with external circumferential ribs 31 to facilitate heat transfer. The shaft extension 24 provides a support for an agitator which rotates with the shaft within the homogenizer casing. The agitator is removably mounted on the shaft extension 24 and may be formed by a series of identical rings 32 which are secured in face to face abutting relation on the shaft extension 24. Each of the rings 32 has an external circumferential rib 33 and the rings 32 are clamped between a shoulder 34 at the forward end of the screw body 5 and a nut 35 screwed onto a threaded portion 36 at the forward end of the extension 24. A spacer 37 is interposed between the innermost of the rings 32 and the end of the screw body 5 and this spacer has a smooth exterior surface over which the materials are delivered from the screw 1 into the homogenizer.

A longitudinal key 38 holds the rings 32 and 37 against rotation with respect to the shaft extension 24 and the abutting faces of the rings are clamped tightly together to provide a continuous external surface. The tubular casing member 25 has a removable liner that may be formed by a series of identical rings 39 that fit within the cylindrical interior of the casing member 25, each of the rings 39 having internal ribs 40 that project into the spaces between the external ribs 33 of the agitator. A spacer ring 41 is interposed between the rearmost ring 39 and the forward end of the adjacent casing section 16 and a second spacer ring 42 is interposed between the forward ring 39 and the extruding head 28. The rings 39, 41 and 42 are clamped tightly together to provide a liner with a continuous internal surface. The external surface of the agitator formed by the rings 32 and their ribs 33 conforms substantially to a surface of revolution coaxial with the shaft on which the rings are mounted and the internal surface of the liner formed by the rings 39 and their ribs 40 also form a surface of revolution which is concentric with that of the agitator and that is complemental to the agitator surface, the surfaces of the liner and agitator being closely and substantially uniformly spaced to provide a tortuous axial passageway from the receiving end of the homogenizer to the discharge end thereof.

The ribs 33 of the agitator are axially opposed to the ribs 39 of the liner and the axially opposed surfaces of these ribs form circumferential flow directing channels in which the material is advanced circumferentially on rotation of the agitator. The rotary movement of the agitator subjects the materials interposed between the closely spaced surfaces of the agitator and liner to a continual shearing or rubbing action during the passage of the material through the homogenizer.

The inner spacer ring 41 has a rearwardly tapering interior face 43 that surrounds the smooth exterior face of the spacer ring 37 to provide a forwardly flaring annular inlet passage 44 through which the material is delivered by the screw 1 to the annular passageway between the agitator and casing liner. The spacer ring 42 at the delivery end of the homogenizer casing has a forwardly tapering interior face 45 that surrounds the nut 35 and the liner ribs 39, 41 and 42 are held against relative rotation with respect to one another and the tubular casing 25 by a longitudinal key 46. The nut 35 has a cylindrical inner portion 47 within the tapering face 45 and the ring 42 has a cylindrical opening 48 into which the portion 47 of the nut extends, an annular passage 49 being formed between the cylindrical opening 48 and the cylindrical exterior face of the nut 35. The nut 35 has a conical end 50 which extends into the extruder head 28 which may provide any suitable extrusion orifice.

In order to effect momentary localized variations in the rate of axial flow of the material through the axial passageway between the agitator and casing, the ribs 33 of the agitator are each provided with slots 51 that form passages through which the material may pass directly from one circumferential flow directing channel to the next. The ribs 39 are provided with slots 52 which provide passages through the fixed ribs. As shown in Figs. 4 and 7, the slots 51 extend through the ribs 33 at an angle to the agitator axis and the slots 51 in the axially spaced ribs 33 are alined along helices disposed at an angle corresponding to the angle of the slots 51 with respect to said axis. The inclination of the slots 51 enables the agitator to exert an axial thrust on the material in the direction of flow. The slots 52 in the casing ribs 40 are preferably disposed at an angle different from that of the agitator rib slots. As shown herein, the slots 52 extend parallel to the axis of the casing and slots of adjacent casing ribs are offset circumferentially with respect to one another. As shown in Fig. 7, the slots of alternate casing ribs may be alined with one another and disposed midway between the slots of intermediate ribs.

In order to uniformly distribute the pulsations due to the intermittent decreases in resistance to flow of the materials due to registry of slots 51 of the agitator ribs intermittently with the slots 52 of the casing ribs, the two sets of slots are differentially spaced. As herein shown, the slots 51 are regularly spaced around the periphery of the agitator at an angle of 90° apart and the slots 52 of the casing ribs are regularly spaced about the circumference of the casing at 120° apart. The four slots of each agitator rib register sequentially with the slots of an adjacent casing rib and one slot moves out of registry as another slot moves into registry so that the total flow is substantially uniform regardless of the momentary localized fluctuations in the flow due to registration of the slots. By staggering the slots of axially spaced ribs circumferentially, a further distribution of the flow impulses is effected and the tendency to produce pulsations due to the mixing action is further reduced. By reason of the distribution of the variations in flow at a great many points throughout the passageway and the sequential and progressive action due to the differential spacing of the slots and the staggering of the slots it is possible to effect an efficient mixing or blending action while the materials are flowing at a relatively rapid rate through the homogenizer unit.

It is apparent that in accordance with the provisions of the patent statutes, modifications of the invention may be made without changing the spirit thereof.

What I claim is:

1. The herein described method of plasticizing and homogenizing plasticizable or plastic materials and delivering them in plastic form which comprises flowing the materials between inner and outer members having exterior and interior surfaces that conform substantially to coaxial closely spaced surfaces of revolution that have axially opposed circumferentially extending portions forming circumferential flow directing channels spaced axially and that form the walls of a tortuous annular passageway, rotating one of said members relative to the other to subject said materials to rubbing action between said surfaces and to cause circumferential flow of said materials in said passageway, applying pressure to said materials in an axial direction to maintain an axial flow of said materials in said passageway, and creating momentary localized variations in the rate of flow of said materials axially and across said circumferential channels sequentially at points spaced circumferentially around said passageway during each revolution of the said one member with respect to the other to progressively mix the materials during their flow through the passageway.

2. The herein described method of plastizing and homogenizing plasticizable or plastic materials and delivering them in plastic form which comprises flowing the materials between inner and outer members having exterior and interior surfaces that conform substantially to coaxial closely spaced surfaces of revolution that have axially opposed circumferentially extending portions forming circumferential flow directing channels spaced axially and that form the walls of a tortuous annular passageway, rotating one of said members relative to the other to subject said materials to rubbing action between said surfaces and to cause circumferential flow of said materials in said passageway, applying pressure to said materials in an axial direction to maintain an axial flow of said materials in said passageway, and creating momentary localized acceleration in flow of said materials sequentially at points spaced circumferentially around said passageway during each revolution of the said one member with respect to the other to progressively mix the materials during their flow through said passageway.

3. The herein described method of plasticizing and homogenizing plasticizable or plastic materials and delivering them in plastic form which comprises flowing the materials between inner and outer members having exterior and interior surfaces that conform substantially to coaxial closely spaced surfaces of revolution that have axially opposed circumferentially extending portions forming circumferential flow directing channels spaced axially and that form the walls of a tortuous annular passageway, rotating one of said members relative to the other to subject said materials to rubbing action between said surfaces and to cause circumferential flow of said materials in said passageway, applying pressure to said materials in an axial direction to maintain an axial flow of said materials in said passageway, and causing momentary increase in axial flow of said material across each of said circumferential channels sequentially and progressively at points spaced circumferentially of each of said channels and at points in axially spaced channels that are staggered circumferentially to progressively mix the materials during their flow through said passageway.

4. The herein described method of plasticizing and homogenizing plastic or plasticizable materials and delivering them in plastic form which comprises flowing the materials between inner and outer members having exterior and interior surfaces that conform substantially to coaxial closely spaced surfaces of revolution that have axially opposed circumferentially extending portions forming circumferential flow directing channels spaced axially and that form the walls of a tortuous annular passageway, rotating one of said members relative to the other to subject said materials to rubbing action between said surfaces and to cause circumferential flow of said materials in said passageway, applying pressure to said materials in an axial direction to maintain an axial flow of said materials in said passageway, and momentarily reducing the resistance to axial flow across said circumferential channels sequentially at points spaced circumferentially of each of said channels during each revolution of said one member to progressively mix the materials during their passage through said passageway.

5. The herein described method of plasticizing and homogenizing plasticizable or plastic materials and delivering them in plastic form which comprises flowing the materials between inner and outer members having exterior and interior surfaces that conform substantially to coaxial closely spaced surfaces of revolution that have axially opposed circumferentially extending portions forming circumferential flow directing channels spaced axially and that form the walls of a tortuous annular passageway, rotating one of said members relative to the other to cause circumferential flow of said materials in said passageway and to subject the same to rubbing action between said surfaces which generates heat in said materials to increase the plasticity thereof, applying pressure to said materials in an axial direction to maintain an axial flow of said materials in said passageway, creating momentary localized variations in the rate of flow of said materials axially across certain of said circumferential channels, sequentially at points spaced circumferentially around said passageway and at points spaced axially of said passageway during each revolution of the said one member with respect to the other to progressively mix the materials during their flow through the passageway, and maintaining a heat transferring relation between the material in said passageway and a surrounding fluid medium maintained at a predetermined temperature to regulate the temperature at which the materials are discharged from said passageway.

6. The herein described method of plasticizing and homogenizing plasticizable or plastic materials and delivering them in plastic form which comprises flowing the materials between inner and outer members having exterior and interior surfaces that conform substantially to coaxial closely spaced surfaces of revolution that have axially opposed circumferentially extending portions forming circumferential flow directing channels spaced axially and that form the walls of a tortuous annular passageway, continuously feeding said materials to said passageway while subjecting them to heat and pressure to at least partially plasticize the same prior to entry thereof into said passageway, rotating one of said members relative to the other to cause circumferential flow of said materials in said passageway and to subject the same to rubbing action between said surfaces which generates heat in said materials to increase the plasticity thereof, applying pressure to said materials in an aixal direction to maintain an axial flow of said materials in said passageway, creating momentary localized accelerations in the flow of said materials sequentially and at points spaced circumferentially around said passageway during each revolution of the said one member with respect to the other to progressively mix the materials during their flow through the passageway, and controlling the temperature at which the materials are discharged from said passageway.

7. A homogenizer and extruder comprising coaxial inner and outer relatively rotatable members, the exterior surface of the inner member and the interior surface of the outer member conforming substantially to coaxial complemental and closely spaced surfaces of revolution that have closely spaced axially opposed rib portions that form circumferential flow directing channels spaced apart axially, said surfaces forming the walls of a tortuous annular passageway, means for delivering materials to one end of said passageway and for applying axial pressure thereto to cause the materials to flow axially in said passageway, means for rotating one of said members relative to the other to cause the materials to flow circumferentially in said passageway and to subject said materials to rubbing action between said surfaces, and means for creating localized increases in axial flow across circumferential channels sequentially and progressively at points spaced circumferentially around said passageway during each revolution of one of said members with respect to the other.

8. A homogenizer and extruder comprising coaxial inner and outer relatively rotatable members, the exterior surface of the inner member and the interior surface of the outer member conforming substantially to coaxial complemental and closely spaced surfaces of revolution that have closely spaced axially opposed rib portions that form circumferential flow directing channels spaced apart axially, said surfaces forming the walls of a tortuous annular passageway, means for delivering materials to one end of said passageway and for applying axial pressure thereto to cause the materials to flow axially in said passageway, means for rotating one of said members relative to the other to cause the materials to flow circumferentially in said passageway and to subject said materials to rubbing action between said surfaces, and means operating during each revolution of one of said members with respect to the other to progressively and sequentially decrease the resistance to axial flow across certain of said channels at points spaced circumferentially around said passageway.

9. A homogenizer and extruder comprising coaxial inner and outer relatively rotatable members, the exterior surface of the inner member and the interior surface of the outer member conforming substantially to coaxial complemental and closely spaced surfaces of revolution that have closely spaced axially opposed rib portions that form circumferential flow directing channels spaced apart axially, said surfaces forming the walls of a tortuous annular passageway, means for delivering materials to one end of said passageway and for applying axial pressure thereto to cause the materials to flow axially in said passageway, means for rotating one of said members relative to the other to cause the materials to flow circumferentially in said passageway and to subject said materials to rubbing action between said surfaces, and means operating during each revolution of one of said members with respect to the other to progressively and sequentially decrease the resistance to axial flow across certain of said channels at points spaced circumferentially thereof and across said other of said channels at points offset circumferentially with respect to the spaced points of the first mentioned channels.

10. A homogenizer and extruder comprising coaxial inner and outer relatively rotatable members, the exterior surface of the inner member and the interior surface of the outer member conforming substantially to coaxial complemental and closely spaced surfaces of revolution that have closely spaced axially opposed rib portions that form circumferential flow directing channels spaced apart axially, said surface forming the walls of a tortuous annular passageway, said rib portions of said inner and outer members having transverse passages connecting the circumferential channels on opposite sides thereof that are differentially spaced circumferentially of said channels, means for delivering materials to one end of said passageway and for applying axial pressure thereto to cause the material to flow axially in said passageway, and means for rotating one of said members relative to the other to subject the material to rubbing action between said surfaces and to cause said transverse passages of adjacent ribs to register in sequence and progressively during each revolution of one of said members with respect to the other.

11. A homogenizer and extruder comprising coaxial inner and outer relatively rotatable members, the exterior surface of the inner member and the interior surface of the outer member conforming substantially to coaxial complemental and closely spaced surfaces of revolution that have closely spaced axially opposed rib portions that form circumferential flow directing channels spaced apart axially, said surfaces forming the walls of a tortuous annular passageway, said rib portions of said inner and outer members having transverse passages connecting the circumferential channels on opposite sides thereof that are regularly spaced circumferentially and that register successively during rotation of one of the members relatively to the other, the number of transverse passages of one rib being aliquant to the number of transverse passages in the ribs on opposite sides thereof, whereby the passages of said one rib register progressively and sequentially with the passages of the next adjacent ribs.

12. A homogenizer and extruder comprising coaxial inner and outer relatively rotatable members, the exterior surface of the inner member and the interior surface of the outer member conforming substantially to coaxial complemental and closely spaced surfaces of revolution that have closely spaced axially opposed rib portions that form circumferential flow directing channels spaced apart axially, said surfaces forming the walls of a tortuous annular passageway, said rib portions of said inner and outer members having transverse passages connecting the circumferential channels on opposite sides thereof that are regularly spaced circumferentially and that registers successively during rotation of one of the members relatively to the other, the number of transverse passages in each rib of one of said members being one less than the number of transverse passages in each rib of the other of said members.

13. A homogenizer and extruder comprising an agitator mounted to rotate about its longitudinal axis, a tubular casing surrounding said agitator, the exterior surface of said agitator and the interior surface of said casing conforming substantially to coaxial and closely spaced surfaces of revolution that have axially opposed closely spaced circumferentially extending rib portions that provide circumferential flow directing channels spaced apart axially, said surfaces forming the walls of a tortuous annular passageway, said agitator ribs and said casing ribs having circumferentially spaced transverse slots that register during rotation of the agitator, the circumferential spacing of the agitator rib slots being different from the circumferential spacing of the casing rib slots, whereby the slots of certain ribs are registered progressively and sequentially with slots of an adjacent rib during each revolution of the agitator.

14. A homogenizer and extruder such as set forth in claim 13 in which each slot of each agitator rib is alined with slots of axially spaced agitator ribs along a helix and in which the slots of the agitator ribs are inclined at an angle to the median plane of the ribs corresponding substantially to the angle of said helix.

15. A homogenizer and extruder such as set forth in claim 11 in which the casing rib slots extend parallel to the axis and in which the slots of successive casing ribs are staggered circumferentially.

16. A homogenizer comprising a tubular casing, a series of abutting rings forming a liner and having interior circumferential ribs, a shaft coaxial with said liner and having a series of abutting rings keyed thereto and having exterior circumferential ribs, said liner and shaft rings having interior and exterior surfaces that conform substantially to closely spaced coaxial surfaces of revolution, said ribs having transverse channels regularly spaced circumferentially thereof that register during rotation of said shaft, the number of channels of certain shaft ribs being aliquant to the number of channels of adjacent liner ribs.

References Cited in the file of this patent
UNITED STATES PATENTS

| | | |
|---|---|---|
| 474,561 | Maxim | May 10, 1892 |
| 2,200,997 | Royle | May 14, 1940 |
| 2,469,999 | Stober | May 10, 1949 |
| 2,593,265 | Chase et al. | Apr. 15, 1952 |
| 2,632,203 | De Laubarede | May 24, 1953 |
| 2,680,879 | Schnuck et al. | June 15, 1954 |
| 2,705,131 | Ross et al. | Mar. 27, 1955 |